H. P. ARMSON.
THREAD CUTTING TOOL OR MILL.
APPLICATION FILED JULY 3, 1916.
1,256,637.
Patented Feb. 19, 1918.
3 SHEETS—SHEET 1.
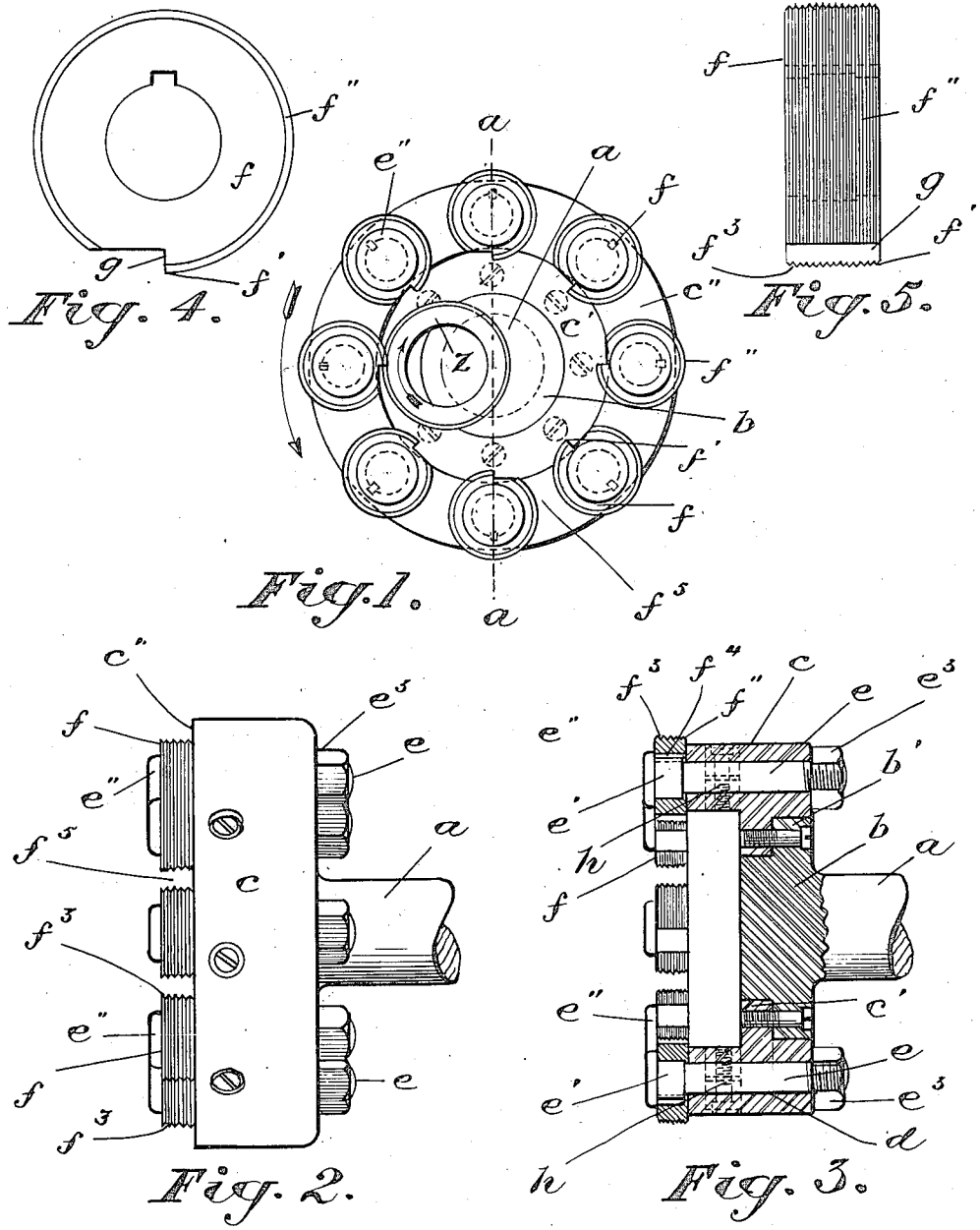

H. P. ARMSON.
THREAD CUTTING TOOL OR MILL.
APPLICATION FILED JULY 3, 1916.

1,256,637.

Patented Feb. 19, 1918.
3 SHEETS—SHEET 2.

Inventor:
Harold P. Armson
per Chas H Riches
Attorney.

H. P. ARMSON.
THREAD CUTTING TOOL OR MILL.
APPLICATION FILED JULY 3, 1916.

1,256,637.

Patented Feb. 19, 1918.
3 SHEETS—SHEET 3.

Inventor:
Harold P. Armson
per Chas. H. Riches
Attorney.

UNITED STATES PATENT OFFICE.

HAROLD P. ARMSON, OF TORONTO, ONTARIO, CANADA, ASSIGNOR TO ARTHUR PEART HOLDEN, OF TORONTO, CANADA.

THREAD-CUTTING TOOL OR MILL.

1,256,637.

Specification of Letters Patent.   Patented Feb. 19, 1918.

Application filed July 3, 1916.   Serial No. 107,425.

*To all whom it may concern:*

Be it known that I, HAROLD PERCIVAL ARMSON, of the city of Toronto, in the county of York and Province of Ontario, Dominion of Canada, have invented certain new and useful Improvements in Thread-Cutting Tools or Mills; and I hereby declare that the following is a full, clear, and exact description of the same.

In an application, Serial No. 94,176, for Letters Patent, by Arthur P. Holden, the thread-cutting tool or mill is shown and described as consisting of a rotary cutter head and a set of dies or tools with their cutting edges in annular alinement concentric with the axis of revolution, each die or tool having chasers or cutters of constant inclination, pitch and depth, with corresponding grooves between them extending from the cutting edge across its cutting face to the opposite edge.

The present invention relates to an improvement in the thread-cutting tool shown and described in Arthur P. Holden's said application, and particularly to the dies and to the means for securing them to the cutter head; and it consists essentially of a set of reversible dies which can be utilized, by proper adjustment, for cutting either a right or left thread in an external or internal surface, each die being made from a cylindrical segment of tool steel, with a cutting edge at one extremity of the arc, and thread-cutters or chasers of constant inclination, pitch and depth, with corresponding grooves between them extending from the cutting edge circumferentially around the die to the opposite extremity of the arc, the cutting edge being formed by the removal of a segment of the die, the secant of the segment being preferably a right plane radial to the axis of the die for uniformity of tooling and adjustment to bring the cutting edges of the dies into annular alinement, each die being preferably mounted on a bolt inserted through the cutter head and held against rotation, when set, by an appropriate locking means.

In the drawings:—

Figure 1, is an elevation showing a cutter head provided with a set of eight dies, set to cut a right external thread;

Fig. 2, is an elevation at right angles to Fig. 1;

Fig. 3, is a vertical section on the line *a—a* Fig. 1, and at right angles to that view;

Fig. 4, is an end elevation of one of the dies on a larger scale than in the preceding views;

Fig. 5, is a lengthwise elevation of the die shown in Fig. 4;

Figure 6:
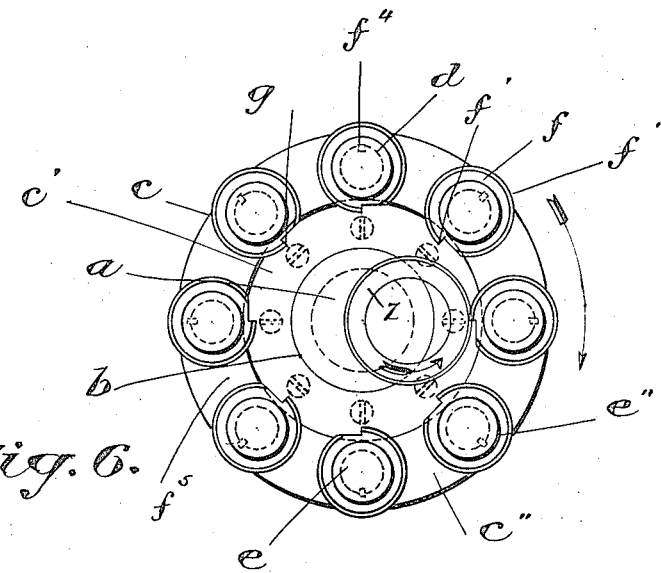
Fig. 6, is a view similar to Fig. 1, showing the dies set to cut a left external thread; and, Figs. 7 and 8, are similar views to Figs. 1 and 6, showing the dies set to cut right and left internal threads, respectively.
Figure 7:
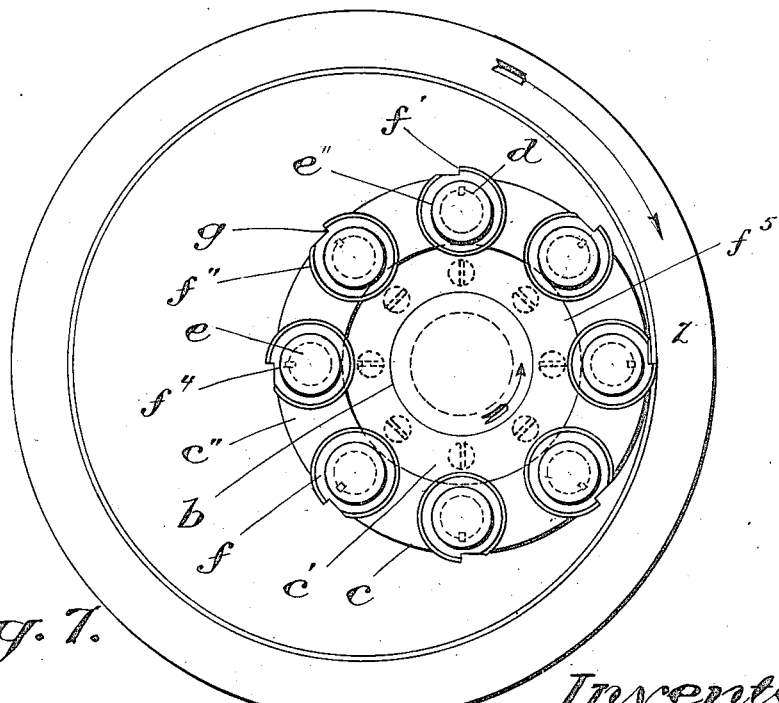
Figure 8:
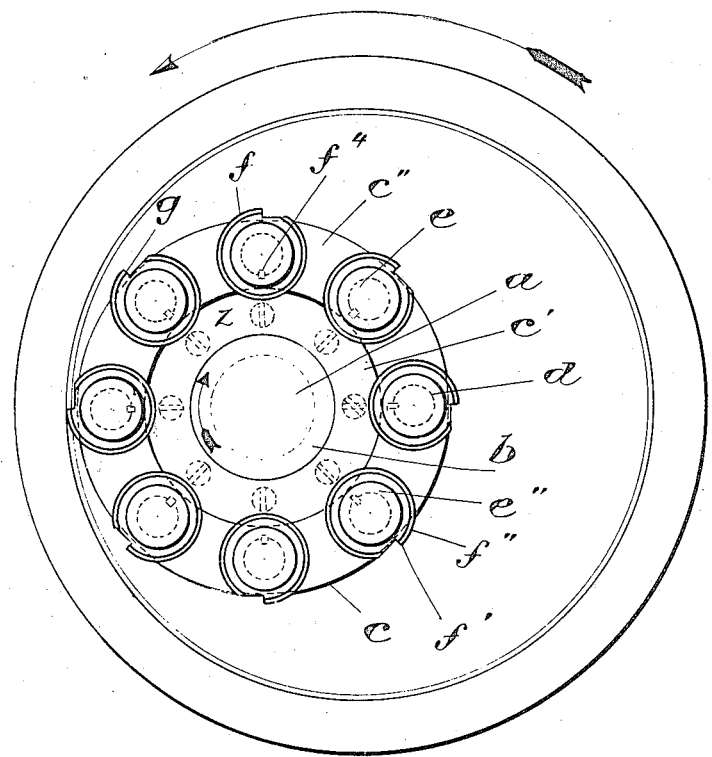

Like characters of reference refer to like parts throughout the specification and drawings, the arrows on Figs. 1, 6, 7 and 8 indicating the rotational direction of the cutters and work.

The cutter spindle $a$ is provided with a head $b$, having a circumferential flange $b'$, forming a seat for the cylindrical cutter head $c$, the cutter head $c$ being formed with an internal flange $c'$ which engages with the flange $b'$ to resist the end thrust of the tool.

Formed through the cutter head $c$ are eight bolt holes $d$ parallel with the axis of the cutter head, equi-spaced, and of equal radii from the center of the cutter head. Extending through each of the bolt holes is a bolt $e$, and mounted on each bolt $e$, in contact with the face $c''$ of the cutter head, is a die $f$. To prevent the dies $f$ rotating upon the bolts $e$, each bolt may be formed with a shank $e'$, of any rectangular or other geometrical shape in cross section, and each die $f$ may be formed with a correspondingly-shaped bore, or the dies may be splined on the bolts, as shown at $f^4$, for the same reason, each bolt $e$ being formed with a head $e''$ overlapping the bore of its respective die, to prevent the displacement of the die from the bolt when the parts are assembled.

Each die consists of a cylindrical segment of tool steel and as shown, particularly in Figs. 4 and 5, is formed with a cutting edge $f'$ at one extremity of its arc, and with cutters or chasers $f''$ of constant inclination, pitch and depth, with corresponding grooves $f^3$ between them extending from the cutting edge around the perimeter of the die to the opposite extremity of the arc.

The secant $g$ of the segment is preferably a right plane radial to the center of the die for uniformity of tooling and facility of adjustment, but it need not necessarily be so, as the secant may be tangential to the arc when it is necessary to vary the cutting action of the die for metals of greater or less degrees of hardness.

During the use of the thread-cutting tool or mill, it is necessary, from time to time, to sharpen the cutting edge, and this necessarily wears the die away. The same thing occurs in the sharpening of a die similar to that shown in Holden's said application, or a thread-cutter formed of a straight bar of steel, and one advantage to be gained from making dies after the manner of that shown in this application, is that a die made of a cylindrical segment of tool steel is equal in wearing value to a bar tool having a length of 3¼ times its diameter, a further advantage being the elimination of the centrifugal motion of the cutter head resulting from the use of elongated cutting tools, and a still further advantage being that the same dies can be utilized for cutting either a right or a left thread.

Assuming that the cutter head is rotating in the direction indicated by arrow in Fig. 1, and that the dies, during rotation in this direction, are cutting a right thread, and that it is required to use these dies for cutting a left thread, it is only necessary to loosen the nuts $e^3$ on the bolts $e$; remove the bolts from the cutter head; reverse the position of the dies upon the bolts; replace the latter in the cutter head; and screw the nuts tightly upon them. Then, the reversal of the rotation of the cutter head will cause the dies to cut a left thread.

In assembling the thread-cutting tool or mill, the bolts are inserted through the bores of the dies, with the cutting edges of all the dies facing the same direction; the bolts are then inserted through the bolt holes $d$ in the cutter head; the bolt heads, dies and bolts being then adjusted until the cutting edges $f'$ of the dies are in annular alinement concentric with the axis of the cutter head, after which the bolts are locked against rotation to maintain the dies in their set position, the locking means preferably consisting of locking screws $h$ inserted through the cutter head to bind against the perimeters of the bolts, as shown in Fig. 3; the lengthwise movement of the bolts being prevented by the nuts $e^3$.

In Fig. 1, the dies are shown with the cutting edges set within the circle of their centers to mill an external thread on the work $z$. In the same figure, the outline of the work is shown to be engaged by the cutting edges of the dies during the rotation of the cutter head.

In the milling of the thread, the work is held by a rotary work holder revolving in the opposite direction to the rotation of the dies, and the axis of the cutter head is eccentric to the axis of the work, the degree of eccentricity increasing as the ratio of the diameter of the work to the diametral distance between the cutting edges decreases, and decreasing as the diameter of the work approximates the diametral distance between the same cutting edges.

In the use of this cutting tool, one or more of the dies may simultaneously engage the work, the number of dies depending upon the ratio of the work to the diametral distance between the cutting edges.

For cutting an internal thread, the same dies and the same cutter head can be employed, in that case, the dies being turned to bring the cutting edges outside the circle of their centers.

During the rotation of the cutter head, when cutting either an internal or external thread, the cutting edges successively engage the work, with the thread cutters or chasers of each die following in the path of the one preceding it, so that when two or more dies simultaneously engage the work, there will be a continuity of engagement between the cutting edges and the surface upon which the thread is being milled.

The result of this action is the production of milled threads, external and internal, in which the faces of the threads show no indications of tool marks, even insignificant ones, and where the dies have been properly tooled, the threads on the finished work have presented a burnished appearance.

The dies $f$ are arranged in an annular set on the cutter head, concentric with its axis, and between each adjacent pair of dies is a separation $f^5$ through which the cuttings are cleared from the chasers, with the result that the dies are constantly freed from all matter which will impede their action or leave any marks upon the finished work which will detract from the quality or the appearance of the thread.

Having thus fully described the nature of my invention, what I claim as new and desire to secure by Letters Patent, is:—

1. A thread cutter comprising a collet, and a set of dies on a side face of the collet, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis thereof.

2. A thread cutter comprising a cylindrical body, and a set of annularly-arranged dies projecting from one side face of said body, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis thereof.

3. A thread cutter comprising a cylindrical body and a set of annularly-arranged dies projecting from the side face of said body, with a radial separation between each adjacent pair of dies, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis thereof.

4. A thread cutter comprising a cylindrical body, a set of annularly-arranged dies projecting from the side face of said body, an arbor, and means for separably securing the cylindrical body to the arbor, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis thereof.

5. A thread cutter comprising a cylindrical body, a set of annularly-arranged dies projecting from the side face of said body, with a radial separation between each adjacent pair of dies, an arbor, a head for the arbor, and means for separably securing the cylindrical body to said head, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis thereof.

6. A thread cutter comprising a cylindrical body, a spindle, a head for the spindle on which said cylindrical body is seated, a flange for said head, and bolts inserted through said flange and cylindrical body to removably secure the cutter thereto, a set of dies secured to one side face of said body, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis thereof.

7. A thread cutter comprising a cylindrical body and an annular set of separated thread-cutting dies on the side face thereof, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis of revolution.

8. A thread-cutting tool comprising a cutter spindle provided with a head having a circumferential flange, a cylindrical cutter head seated on said flange and having an internal flange engaging therewith, a set of dies secured to the side face of the cylindrical cutter head, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc.

9. A thread cutter comprising a cylindrical body and a set of annularly-arranged dies projecting from the side face of said body, with a radial separation between each adjacent pair of dies, each of said dies consisting of a cylindrical segment having a cutting edge at one extremity of its arc and a plurality of chasers of constant inclination, pitch and depth, with corresponding grooves between them extending from the cutting edge around the perimeter of the die to the opposite extremity of the arc, the cutting edges of the dies being in annular alinement and concentric with the axis thereof, and means for removably securing the cylindrical dies to the cylindrical body.

Toronto, May 18th, 1916.

HAROLD P. ARMSON.

Signed in the presence of—
  CHAS. H. RICHES,
  EDWARD V. BERNSTEIN.